United States Patent [19]

Upmeier

[11] 4,080,143

[45] Mar. 21, 1978

[54] COOLING APPARATUS FOR AIR COOLING TUBULAR PLASTICS FILM MADE BY A FOAM BLOWHEAD

[75] Inventor: Hartmut Upmeier, Lengerich, Germany

[73] Assignee: Windmoller & Holscher, Lengerich, Germany

[21] Appl. No.: 751,064

[22] Filed: Dec. 13, 1976

[30] Foreign Application Priority Data

Dec. 11, 1975 Germany .............................. 2555848

[51] Int. Cl.² .............................................. B29F 3/08
[52] U.S. Cl. ................................... 425/445; 425/72 R
[58] Field of Search .................................. 425/72, 445

[56] References Cited

U.S. PATENT DOCUMENTS 3,709,290  1/1973  Upmeier ........................ 425/72 X
3,976,411  8/1976  Rahlfs et al. ...................... 425/72 R
3,990,828  11/1976  Reifenhouser ................ 425/72 R X Primary Examiner—Robert L. Spicer, Jr.
Attorney, Agent, or Firm—Fleit & Jacobson

[57] ABSTRACT

In a film blowhead for making tubular plastics film, internal cooling air is supplied through a central aperture in the blowhead to superposed cooling air supply rings which support the film on the inside and have outlet apertures facing the film as well as apertures extending axially therethrough for withdrawing the heated cooling air. A central tube is provided to supply the cooling air, the tube being connected to the air supply rings by radial air passages. The annular space between the central tube and the film blowhead and the air supply rings forms an annular passage for withdrawing the heated cooling air.

8 Claims, 1 Drawing Figure

U.S. Patent
March 21, 1978
4,080,143
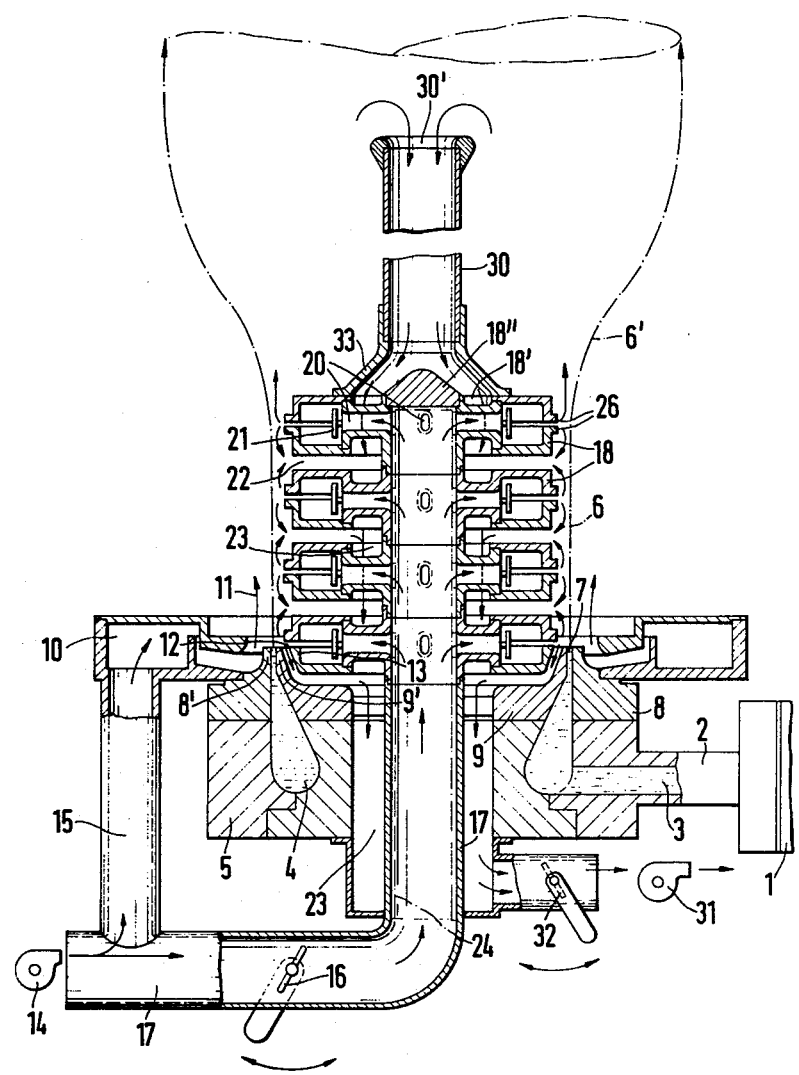

COOLING APPARATUS FOR AIR COOLING TUBULAR PLASTICS FILM MADE BY A FOAM BLOWHEAD

This invention relates to an improvement in or modification of the subject matter disclosed in German Patent Application P 22 62 190.5–16 which corresponds to U.S. Pat. No. 3,898,028 filed 13th Dec. 1973

U.K. Application 58495/73 filed 18th Dec. 1973

Japanese Application 142963/1973 filed 19th Dec. 1973

Canadian Application 188493 filed 19th Dec. 1973.

The invention relates to a cooling apparatus for tubular plastics film made by a film blowhead, wherein provision is made for air cooling and replacement of the internal cooling air through a central aperture in the blowhead, comprising superposed cooling air supply rings for supporting the film on the inside and having gap-like outlet apertures facing the film and apertures extending axially through the air supply rings for the passage of the cooling air withdrawn between the air supply rings, according to U.S. Pat. No. 3,898,028.

In film blowing installations having advantageous air cooling of the tubular film, the high capacity output has been attainable only by means of installations equipped with internal air cooling apparatus in which there is replacement of the cooling air through a central aperture in the blowhead. The internal cooling apparatus for the tubular film in accordance with the parent patent has proved particularly efficient.

In the internal cooling apparatuses described in the parent patent, the increased output is achieved by the repeated supply of fresh cooling air through superposed internal cooling rings between which the heated cooling air is withdrawn radially inwardly. The supply of the cooling air to the internal cooling rings takes place through an annular passage which is provided in the blowhead and which coaxially surrounds the air discharge tube. In apparatus according to the parent patent, it has been found that the supplied cooling air is undesirably heated because it must be passed between two walls which, despite the presence of thermal insulation, become not after a prolonged operating period. Further, the cooling air led to the nozzle gap and passed between the lowermost air guiding ring and the surface of the nozzle ring does not act with sufficient intensity on the upwardly curved lip of the inner nozzle ring that is to be cooled because it becomes prematurely heated.

It is therefore the problem of the present invention to improve the apparatus of the parent patent by avoiding premature heating of the supplied cooling air and consequent losses in cooling efficiency.

According to the invention, this problem is solved in an apparatus according to the parent patent in that a central tube is provided to supply the cooling air, the tube being connected to the air supply rings by radial air passages, and that the annular space disposed between the central tube and the film blowhead as well as the air supply rings forms an annular passage for withdrawing the heated cooling air. By means of the apparatus according to the invention, one prevents the cooling air from coming into direct contact with the hot parts of the film blowhead. Since the central tube guiding the cooling air from the film blowhead is bounded by the surrounding annular passage leading off the heated cooling air, good thermal insulation is provided with respect to the film blowhead itself.

According to an advantageous embodiment of the invention, provision is made that the central tube in the vicinity of the air supply rings is built up of individual spider-like elements which can be held together by a tension anchor. By means of this construction, the internal cooling apparatus can be constructed in a simple manner to any desired height. The cooling air can be supplied to the air supply rings through the spoke-like tubular webs, these being at the same time secured thereto for the purpose of mounting them.

The inner ring segments of the air supply rings can be made in one piece with the spider-like air passages and the outer ring segments can be screwed onto same. When changing the nozzle diameter of the blowhead, only the outer ring segments need be replaced by ring segments having the corresponding outer diameter.

In a further development of the invention, in the vicinity of the air supply rings the central tube can be made in one piece with the radial air passages to form a body to which the air ring segments are secured.

To obtain good cooling of the upwardly curved lip of the internal nozzle ring, the upper edge of the aperture in the lowermost internal cooling ring segment can be flush with the upper edge of the internal nozzle ring and the cooling air can be led between both to the annular withdrawal passage.

By dimensioning the suction space remaining between the internal cooling rings, one can influence the suction with which the heated cooling air is sucked out of the upper region of the foam bubble.

An example of the invention will now be described in more detail with reference to the drawing, in which the single FIGURE is a diagrammatic section through the cooling apparatus.

The molten material is led from the diagrammatically indicated extruder 1 through the connection 2 and the passage 3 into the distributing passage 4 of the blowhead 5, the distributing passage being illustrated in simplified form. The tubular film 6 is shaped by means of the nozzle gap 7 formed by the nozzle rings 8, 9, the nozzle lips 8',9' projecting in the form of annular beads for the purpose of better cooling of this portion. The distended and cooled tubular film 6' is, as usual, flattened, taken off and fed to a coiler (not shown).

On the outside of the tubular film, the nozzle lip 8' and the tubular film are cooled by the cooling ring 10 with the aid of the stream 11 of cooling air.

The cooling air for the outer cooling ring or the internal cooling apparatus for the tubular film is conveyed by the diagrammatically indicated fan 14 and fed by means of the branch tube 15 to the cooling ring 10 and by means of the tube 17 to the internal cooling apparatus. A throttle flap 16 controls the quantity of the conveyed internal cooling air and consequently the degree of inflation.

The internal cooling air is passed through the radial tube webs 20 into the internal cooling rings 18 secured to the hub portion 18'. Baffle plates 21 even out the air distribution and the withdrawal of air from the cooling ring lips 26. The cooling air leaving the cooling ring 18 is passed by means of the radial passages 22 between the cooling rings to the annular chamber 23 out of which the warm air is withdrawn by means of the diagrammatically indicated fan 31 having the throttle flap 32. The total amount of internal cooling air can be determined by means of the throttle flap 32 whereas, the already mentioned, the throttle flap 16 in the air supply controls the degree of inflation.

Cooling of the projecting annular bead 9' of the internal nozzle ring takes place by means of the stream 12 of cooling air which is passed between the adapted lowermost cooling ring 13 and the nozzle ring 9. The lower outlet edge of the cooling air gap is preferably at the same level as the upper edge of the nozzle ring lip 9'.

The internal cooling air tube 17 is desirably lined with a diagrammatically indicated thermal insulation 24 and the end of this tubular conduit is closed by the streamlined body 18".

The warm air contained within the film bubble 6' is sucked off by means of the withdrawal tube 30, 30' and fed through the connecting portion 33 to the annular passage 23.

Elements such as tension anchors for holding the individual internal cooling rings together are not shown. Instead of the internal portion 18', 20 whichis built up in storeys, this part can also be made as a single casting to which the outer cooling rings 18 are secured by means of tension anchors.

I claim:

1. In a cooling apparatus for tubular plastics film made by a film blowhead, wherein provision is made for air cooling the tubular plastics film and replacement of internal cooling air through a central aperture in the blowhead, the apparatus comprising superposed cooling air supply rings for supporting the film on the inside and having gap-like outlet apertures facing the film for directing cooling air onto the film, supply means for furnishing cooling air from the central aperture to the air supply rings and removal means including apertures extending axially through the air supply rings for the passage of the cooling air withdrawn between the air supply rings for removing heated cooling air, the improvement wherein the supply means includes a central tube attached to the central aperture and connected to the air supply rings by radial air passages, and the removal means includes a first annular space disposed between the central tube and the film blowhead and a second annular space disposed between the central tube and the air supply rings, the second annular space being connected to the first annular space to form an annular withdrawal passage for withdrawing the heated cooling air.

2. The improvements according to claim 1, characterised in that the central tube is provided with heat insulation.

3. The improvement according to claim 1, characterised in that the upper edge of the aperture in the lowermost internal cooling ring is flush with the upper edge of an internal nozzle ring of the film blowhead and the cooling air is led between both to the annular withdrawal passage.

4. The improvement according to claim 1, characterised in the baffle surfaces are provided in front of the mouths of the air passages in the cooling rings.

5. The improvement according to claim 1, characterised in that the central tube in the vicinity of the air supply rings is built up of individual spider-like elements held together by a tension anchor, each of the elements including radial air passages.

6. The improvement according to claim 5, characterised in that the air supply rings are formed of outer ring segments attached to inner ring segments, the inner ring segments of the air supply rings being made in one piece with the air passages of the spider-like elements.

7. The improvement according to claim 1, characterised in that in the vicinity of the air supply rings the central tube is made in one piece with the radial air passages to form a body to which the air supply rings are secured.

8. The improvement according to claim 6, characterised in that the outer ring segments are connected to the inner ring segments by screws.

* * * * *